(12) United States Patent
Marrero

(10) Patent No.: US 6,616,103 B2
(45) Date of Patent: Sep. 9, 2003

(54) CARGO CONTAINER APPARATUS, CARGO CONTAINER AND METHODS OF LOADING CARGO

(76) Inventor: Louis Marrero, 1415 Chaffee Dr., Titusville, FL (US) 32780

( * ) Notice: Subject to any disclaimer, the term of this patent is extended or adjusted under 35 U.S.C. 154(b) by 0 days.

(21) Appl. No.: 09/961,140

(22) Filed: Sep. 21, 2001

(65) Prior Publication Data

US 2002/0074456 A1 Jun. 20, 2002

Related U.S. Application Data

(60) Provisional application No. 60/249,162, filed on Nov. 17, 2000, and provisional application No. 60/251,780, filed on Dec. 8, 2000.

(51) Int. Cl.$^7$ .................................................. B64D 9/00
(52) U.S. Cl. ..................... 244/137.1; 220/1.6; 414/353
(58) Field of Search .......................... 244/118.1, 137.1; 220/1.6; 414/347, 353, 497, 573, 800

(56) References Cited

U.S. PATENT DOCUMENTS

| | | | | |
|---|---|---|---|---|
| 1,910,398 A | * | 5/1933 | Ludington | 414/470 |
| 2,002,455 A | | 5/1935 | Schwerin | 280/44 |
| 3,263,832 A | * | 8/1966 | Williams Jr. et al. | 244/137.1 X |
| 3,419,164 A | | 12/1968 | O'Neill | 214/38 |
| 3,598,273 A | | 8/1971 | Rau et al. | 220/1.5 |
| 3,666,127 A | | 5/1972 | Guyaux | 214/512 |
| 3,672,529 A | | 6/1972 | Feddersen et al. | 220/1.5 |
| 3,853,239 A | | 12/1974 | Meller et al. | 220/1.5 |
| 4,049,135 A | | 9/1977 | Glassmeyer | 214/38 |
| RE30,191 E | | 1/1980 | Mautz | 280/43.23 |
| 4,221,536 A | | 9/1980 | McFee | 414/786 |
| 4,355,840 A | | 10/1982 | Szendrodi et al. | 296/179 |
| 4,747,504 A | | 5/1988 | Wiseman et al. | 220/1.5 |
| 4,817,824 A | * | 4/1989 | LaFleur et al. | 220/1.6 X |
| 5,180,078 A | | 1/1993 | Looker | 220/665 |
| 5,186,417 A | * | 2/1993 | Pritchard | 244/137.1 |
| 5,238,102 A | | 8/1993 | Langer | 206/3 |
| 5,778,488 A | | 7/1998 | Tsai | 16/34 |
| 5,806,863 A | | 9/1998 | Heger et al. | 280/33.998 |
| 6,047,588 A | | 4/2000 | Danilychev | 73/23.2 |
| 6,161,714 A | | 12/2000 | Matsuura et al. | 220/1.5 |
| 6,192,834 B1 | * | 2/2001 | Kolozsvari | 119/498 |
| 6,360,865 B1 | | 3/2002 | Leon | 193/35 |
| 6,406,249 B1 | * | 6/2002 | McAdams et al. | 244/137.1 X |
| 2001/0008985 A1 | | 7/2001 | Wada | 701/1 |
| 2002/0002939 A1 | | 1/2002 | Beauchesne et al. | 114/382 |

OTHER PUBLICATIONS

Airtrax Inc. Website Brochure Jan. 17, 2002.

* cited by examiner

Primary Examiner—Robert P. Swiatek
(74) Attorney, Agent, or Firm—Bracewell & Patterson, L.L.P.

(57) ABSTRACT

A cargo container apparatus and methods of loading cargo. The cargo container apparatus includes a cargo container having first and second opposing side frame portions connected by connecting members and a plurality of liners forming floor and wall portions of the cargo container. The cargo container apparatus also includes a cargo container transporter having a base portion, an elevatable platform, a pair of side support rails, and front and rear ramps. Methods of transporting in a cargo hold are also provided. The methods include expanding a cargo container from a collapsed position, connecting a liner to a lower portion of the expanded container to form a floor, and loading cargo into the expanded cargo container.

72 Claims, 9 Drawing Sheets

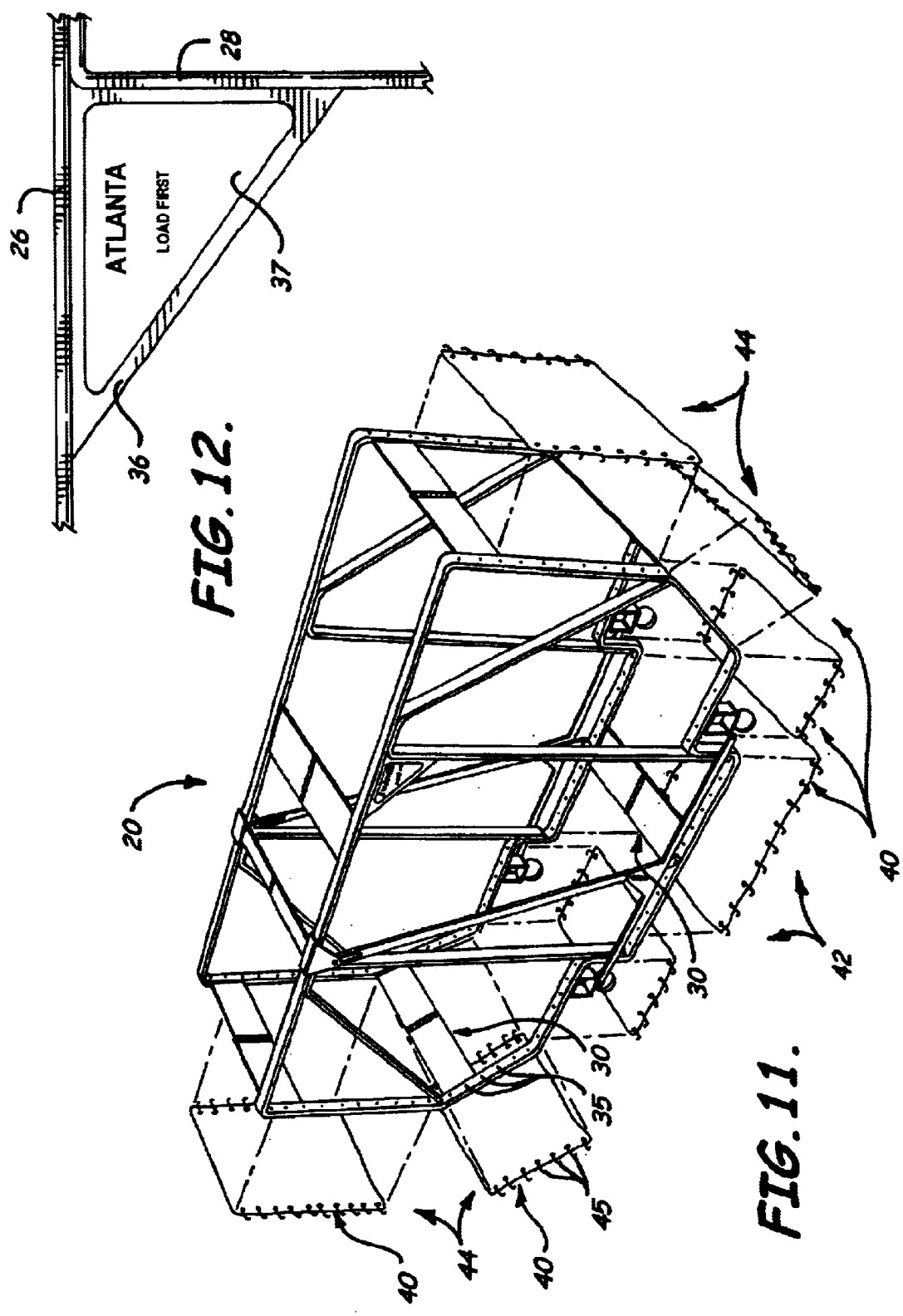

CARGO CONTAINER APPARATUS, CARGO CONTAINER AND METHODS OF LOADING CARGO

CROSS REFERENCE TO RELATED APPLICATIONS

The present application claims the benefit of Provisional Patent Application Serial No. 60/249,162, filed on Nov. 17, 2000, titled, Mobile Aircraft Baggage and Cargo Pallet Handling System; Provisional Patent Application Serial No. 60/251,780, filed on Dec. 8, 2000, titled, Mobile Aircraft Baggage and Cargo Pallet Handling System Continuation Addendum, and Provisional Patent Application Serial No. to be assigned, filed on Feb. 16, 2001, titled, Mobile Aircraft Baggage and Cargo Organizer and Assembly Method, all of which are incorporated herein by reference in their entireties.

FIELD OF THE INVENTION

The present invention relates to the airline industry, and more particularly, the field of cargo handling.

BACKGROUND OF THE INVENTION

One of the most time consuming and costly processes in the airline industry, both the commercial and cargo airline industry, is loading and unloading cargo and luggage from an aircraft before takeoff and after landing. In the commercial airline industry, the current process of loading and unloading luggage begins when passengers check in multiple articles of luggage at a front gate or at curbside check-in. The luggage is labeled with the final destination and sent through a complicated sorting process. Once the luggage is sorted, it is loaded onto one of a plurality of luggage carriers. The plurality of luggage carriers are then linked together and transported to the aircraft in a "train" formation. When the "train" of luggage carriers arrive at the location of the aircraft, a series of steps and a plurality of persons are required to unload the individual articles of luggage from each of the luggage carriers, place the individual articles of luggage on a conveyor belt that transports each individual article of luggage to a cargo hold in the lower fuselage of the aircraft, receive each individual article of luggage at the entrance of the cargo hold, and organize the individual articles of luggage within the cargo hold of the aircraft.

The loading and unloading of an aircraft require the services of several persons conducting manual labor. For example, at least one person loads the individual articles of luggage onto one of the plurality of carts that form the "train" to be transported to the aircraft. At least another person transports the luggage to the aircraft by pulling the "train" of carts using a transport vehicle. Yet another person unloads the luggage from the plurality of carts piece by piece, and places each article of luggage onto a conveyor that transports the luggage up to the entrance of the cargo hold of the aircraft. When the luggage arrives at the entrance of the cargo hold, yet another person receives each individual article of luggage and carries it to a storage area within the cargo hold. The clearance of the cargo hold is very low, i.e., approximately 3'–4', and therefore, the person that is organizing the luggage and transporting it to the storage area of the cargo hold must be in a crouched position in order to maneuver through the cargo hold. This same process is repeated when unloading the aircraft upon arrival.

Problems that often arise with this process include serious back injuries and excessive time consumption. The process must be performed quickly in order for airlines to stay on a strict schedule that is calculated down to the minute. The use of several different persons and several loading and unloading steps, however, are time consuming. This process is also disadvantageous because of the confusion that often occurs when loading and unloading luggage and cargo, which sometimes results in a luggage loss. Several articles of luggage must normally be sorted through in order to determine which articles of luggage should be removed from the aircraft cargo hold and which articles of luggage are to remain in the aircraft cargo hold. It is also time consuming to separate and organize the several articles of luggage depending on the final destination of the luggage. The process of carrying heavy luggage while in a crouched position can cause serious back injuries to the persons performing the manual labor.

Cargo containers that can be positioned in an aircraft cargo hold are also known and can be seen in U.S. Pat. No. 3,672,529 to Feddersen et al., titled Cargo Holder and U.S. Pat. No. 4,747,504 to Wiseman et al., titled Aircraft Cargo Container. These cargo containers can be loaded with various types of cargo, including luggage, and positioned in a cargo hold of an aircraft. The cargo containers described in the above referenced patents, however, are rigid. Therefore, regardless of whether the cargo containers are full or empty, they will still occupy the same amount of space. These cargo containers are also disadvantageous because excess equipment must be used to load them onto a luggage "train" and then unload the carriers from the luggage "train" and onto the aircraft.

Luggage containers that can be positioned in the bottom portion of an aircraft fuselage are also known, such as seen in U.S. Pat. No. 3,419,163 to O'Neill, titled Method and Apparatus For Handling Aircraft Passengers, Baggage and Freight. Similar to the luggage containers mentioned above, the luggage container described in O'Neill will occupy a similar amount of space regardless of whether or not it is full of cargo.

SUMMARY OF THE INVENTION

With the foregoing in mind, the present invention advantageously provides a cargo container apparatus and methods for transporting cargo between a plurality of preselected destinations. The cargo container apparatus and methods of the present invention advantageously enhances the efficiency of the cargo loading process by eliminating several steps that are encountered when loading cargo into an aircraft, and more particularly, when loading luggage into a cargo hold of a passenger aircraft. The apparatus and methods of the present invention also advantageously minimizes the time required to transfer cargo between aircrafts, i.e., connecting flights. The present invention further advantageously decreases manual labor necessary to load and unload aircraft of cargo and luggage.

More particularly, the present invention includes a cargo container apparatus having at least one cargo container and a cargo container transporter. The cargo container has a first side frame portion and a second side frame portion positioned substantially opposite the first side frame portion. The first and second side frame portions include a plurality of outer periphery frame members and a plurality of inner frame brace members positioned to connect to the plurality of outer periphery frame members. The first and second side frame portions are connected by a plurality of connecting members so that the first and second side frame portions are positioned spaced-apart and substantially parallel.

The cargo container also includes a plurality of liners positioned to detachably connect to the plurality of outer periphery frame members of the first and second side frame portions. The plurality of liners include a first plurality of liners that are positioned to detachably connect to the plurality of outer periphery frame members and overlie the plurality of connecting members to thereby form a floor of the cargo container. The liners also include a second plurality of liners positioned to detachably connect to the plurality of outer periphery frame members and overlie the plurality of inner frame brace members to thereby form wall portions of the cargo container. The detachably connected liners advantageously provide a plurality of configurations for the cargo containers, i.e., a cargo container can include walls on all sides of the cargo container if desired, or only on some of the sides of the cargo container.

The cargo container transporter includes a base portion and an elevatable platform positioned thereon. The base portion advantageously includes a wheeled vehicle. The elevatable platform includes a cargo container support surface and a pair of side support rails extending outwardly from the cargo container support surface. Each one of the pair of side support rails are advantageously positioned substantially opposite the other one of the pair of side support rails. The cargo container transporter also advantageously includes front and rear ramps positioned to respectively extend outwardly from a front portion and a rear portion of the cargo container support surface. The front and rear ramps of the cargo container transporter advantageously decrease the equipment necessary to load and unload the cargo containers into an aircraft cargo hold.

The present invention also includes a cargo organization system for transporting cargo in an aircraft cargo hold between a plurality of preselected destinations. The cargo organization system includes a plurality of cargo containers. Each one of the plurality of cargo containers includes one of a plurality of preselected destinations so that cargo having similar destinations can be positioned in one of the plurality of cargo containers. The cargo organization system also includes a label positioned on an outer portion of each of the plurality of cargo containers for identifying one of the plurality of preselected destinations of the cargo positioned in one of the plurality of cargo containers.

The cargo organization system further includes a loading order selector for selecting the order in which the plurality of cargo containers are loaded into the aircraft cargo hold. The loading order selector advantageously decreases the time necessary to load and unload cargo from an aircraft cargo hold by preselecting the order of loading of the cargo containers so that cargo containers having a destination of the first stop of the aircraft are loaded last. This advantageously eliminates the time associated with unloading cargo containers that are blocking other cargo containers.

The present invention further advantageously includes a method of transporting cargo in an aircraft cargo hold. The method includes expanding one of a plurality of cargo containers from a collapsed position, connecting a liner to a lower portion of the expanded cargo container to form a floor of the expanded cargo container, and loading cargo into the expanded cargo container.

The present invention advantageously eliminates the need for excessive manual labor to load and unload several articles of luggage into an aircraft cargo hold. More particularly, the present invention advantageously eliminates the need for a person working in a crouched position to organize luggage in an aircraft cargo hold having low clearance. The present invention advantageously allows luggage and cargo to be organized and stored into cargo containers before being loaded into an aircraft cargo hold. The present invention also eliminates the need for excessive equipment necessary to load and unload cargo, such as luggage, from an aircraft cargo hold.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 1A is a perspective view of side rails having a conveyor associated therewith according to the present invention;

FIG. 1B is a perspective view of a remote control unit according to the present invention;

FIG. 11 is an exploded perspective view of a plurality of liners being detachable connected to a cargo container according to the present invention;

FIG. 12 is a front elevational view of a label for a cargo container according to the present invention;

DETAILED DESCRIPTION OF THE PREFERRED EMBODIMENTS

The present invention will now be described more fully hereinafter with reference to the accompanying drawings which illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, the prime notation, if used, indicates similar elements in alternative embodiments.

Referring to FIGS. 1–14, the present invention includes a cargo container apparatus 10 for arranging cargo in a cargo hold 17. The cargo hold 17 into which cargo 12 is arranged can be a cargo hold 17 positioned in a lower fuselage of an aircraft, but can also be a cargo hold 17 of other transportation devices, such as trains or cruise ships, for example.

Figure 3:
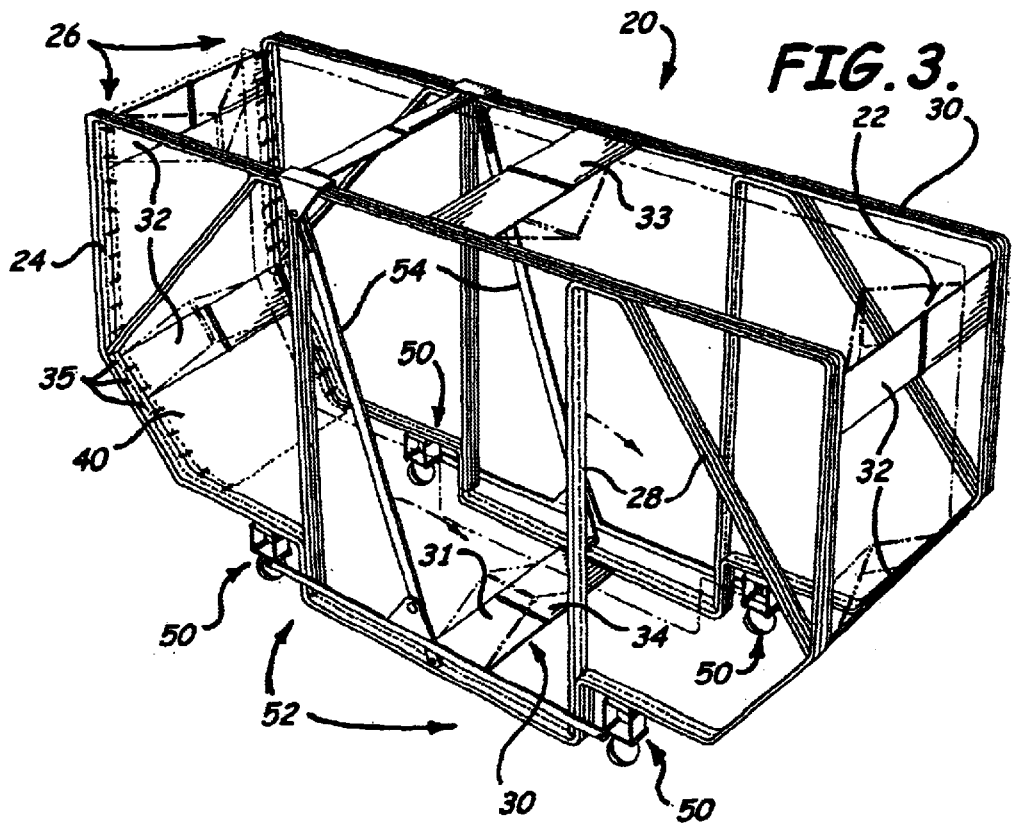
FIG. 3 is a perspective view of a cargo container according to the present invention.

As illustrated in FIG. 3, the cargo container apparatus 10 and the present invention advantageously includes at least one cargo container 20 having a first side frame portion 22 and a second side frame portion 24 positioned substantially opposite the first side frame portion 22. The first 22 and second 24 side frame portions include a plurality of outer periphery frame members 26. The outer periphery frame members 26 preferably form an outer surface portion of each of the first 22 and second 24 side frame portions. The outer periphery frame members 26 can advantageously be made of a plastic material, such as low density polyethylene, or any other material having light weight and high strength, as understood by those skilled in the art. The use of a plastic material advantageously provides a cargo container 20 that is light in weight and strong enough to receive several articles of luggage or heavy cargo 12.

The first 22 and second 24 side frame portions of the cargo container 20 also include a plurality of inner frame brace members 28 positioned to connect to the plurality of outer periphery frame members 26. The inner frame brace members 28 advantageously provide added support between the outer periphery members 26, thereby advantageously enhancing the strength of the cargo containers 20.

Figure 4:
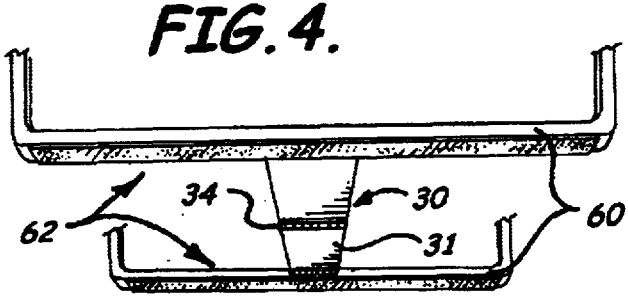
FIG. 4 is a fragmentary perspective view of a bottom portion of a cargo container according to the present invention.

As best illustrated in FIGS. 3–4, the first 22 and second 24 side frame portions can advantageously be connected by a plurality of connecting members 30. The connecting members 30 are positioned to extend between the first 22 and second 24 side frame portions. More particularly, the connecting members 30 can advantageously include lower connecting members 31, side connecting members 32 and top connecting members 33. The lower connecting members 31 can advantageously be positioned to connect lower portions of the first 22 and second 24 side frame members. The side connecting members 32 can advantageously be positioned to connect side portions of the first 22 and second 24 side frame members. The top connecting members 33 can advantageously be positioned to connect top portions of the first 22 and second 24 side frame members. The plurality of connecting members 30 are further positioned to connect the first 22 and second 24 side frame portions so that the first 22 and second 24 side frame portions are positioned spaced apart and substantially parallel. Each of the connecting members 30 can be a plastic material, such as a low density polyethylene, or any other material having high strength properties and that is light in weight, as understood by those skilled in the art.

The cargo container 20 can also advantageously include a plurality of liners 40 positioned to detachably connect to the outer periphery-frame members 26 of the first 22 and second 24 side frame portions. The plurality of liners 40 (FIG. 11) can advantageously be made of a fabric material. The fabric material can be a tightly woven fabric material having high strength properties and low stretch properties. The plurality of liners 40 can also advantageously be a canvas material, or any other material having high strength properties, as understood by those skilled in the art. Each of the plurality of liners 40 can also advantageously include a plurality of fasteners 45 (FIG. 11) attached to outer periphery portions of each of the plurality of liners 40. Likewise, the outer periphery frame members 26 of the first 22 and second 24 side portions can include a plurality of fastener receivers 35 (FIG. 11) to receive each of the plurality of fasteners 45 of each of the plurality of liners 40. The fastener receivers 35 can advantageously be a hole drilled into portions of the outer periphery frame members 26. Each of the plurality of holes can be drilled into a portion of the outer periphery frame member 26 that will have no adverse effect on the strength of the cargo container 20.

As illustrated in FIG. 11, the plurality of liners 40 include a first 42 and a second 44 plurality of liners positioned to detachably connect to the outer periphery frame members 26. The first plurality of liners 42 can advantageously be positioned to overlie the plurality of connecting members 30, and more particularly, to overlie the plurality of lower connecting members 31, to form a floor portion of the cargo container 20. The second plurality of liners 44 can advantageously be positioned to overlie the plurality of inner frame brace members 28 to form wall portions of the cargo container 20. The second plurality of liners 44 can also advantageously be positioned to overlie the side connecting members 32 to form wall portions of the cargo container 20. The plurality of liners 40 advantageously allow the user U of the cargo container apparatus 10 to customize the cargo container 20 as desired. For example, the user U can connect the second plurality of liners 42 to desired sides of the cargo container 20. This allows the user to have a cargo container 20 having some sides with walls and some open sides, for example. Similarly, the user can connect the first plurality of liners 42 to the outer periphery frame members 26 to form some floor portions, leaving other lower portions between the first 22 and second 24 side frame portions open. This advantageously saves time when loading and unloading cargo 12 because the user U can connect the first plurality of liners 42 to the cargo container 20 only when necessary.

The liners 40 can also advantageously include a third plurality of liners positioned to detachably connect and overlie the top connecting members 33 to form a roof portion of the cargo container 20. In times of adverse weather, such as rain or snow, or if the cargo 12 to be transported in the cargo container 20 must be protected from environmental conditions, the third plurality of liners can advantageously provide a cover over the top of the cargo 12 positioned in the cargo containers 20.

Figure 9:
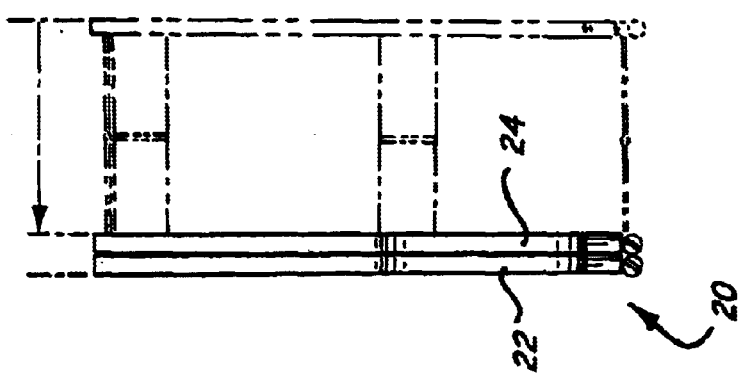
FIG. 9 is a side elevational view of a collapsing cargo container according to the present invention.
Figure 10:
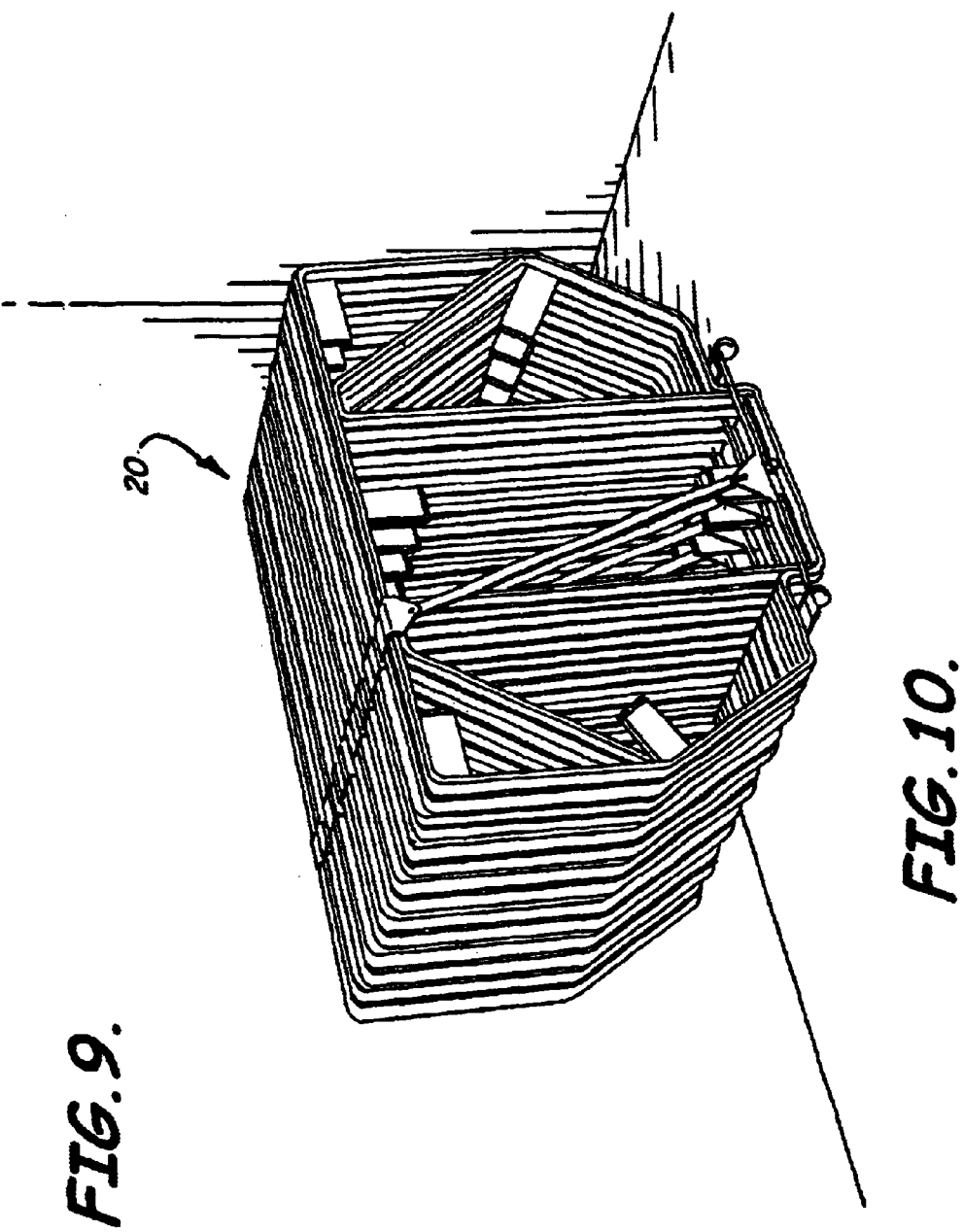
FIG. 10 is a perspective view of a plurality of collapsed cargo containers according to the present invention.

As best illustrated in FIG. 3, each of the plurality of connecting members 30 of the cargo containers 20 can be collapsible connecting members. The plurality of collapsible connecting members can be positioned to collapsibly connect the first 22 and second 24 side frame portions so that the first 22 and second 24 side frame portions can be positioned a first predetermined distance apart when the plurality of collapsible connecting members are in an extended position and a second predetermined distance apart when the plurality of collapsible connecting members are in a collapsed position. As illustrated in FIGS. 9–10 this advantageously allows the cargo containers 20 to be collapsible cargo containers. Collapsible cargo containers advantageously utilize less space in storage. For example, when the cargo container 20 does not contain cargo 12, it can be collapsed and stored in a smaller amount of space. The cargo containers 20 can also be collapsed and stored in an aircraft cargo hold 17. An aircraft 15 carrying a plurality of collapsed cargo containers 20 can advantageously pick up cargo 12 regardless of whether or not cargo containers 20 are available. If, for example, an aircraft arrives at a predetermined destination where no cargo containers 20 are available, a collapsed cargo container 20 being stored in the aircraft cargo hold 17 can be easily unloaded from the aircraft cargo hold 17, loaded with cargo 12, and reloaded into the aircraft cargo hold 17.

As illustrated in FIGS. 3–4, the plurality of connecting members 30 can further advantageously include a hinge 34 for collapsing the connecting members. The hinge 34 can advantageously be positioned on a medial surface portion of the connecting member 30 and include a released position and a locked position. When positioned in the released position, the bottom connecting member 31 can be folded upwardly, the side connecting members 32 can be folded inwardly, and the top connecting members 33 can be folded downwardly, i.e., the connecting members 30 can be folded into the inner portion of the cargo container 20. Therefore, when positioned in the released position, the cargo container 20 is collapsed. When positioned in the locked position, each of the plurality of connecting members 30 are unfolded, thereby allowing the cargo container 20 to be extended. The connecting members 30 can also include a fastener for securing the hinge 34 in either a locked or released position. This advantageously insures that once the cargo container 20 is collapsed or expanded, it will remain in that position until the user U of the cargo container 20 wishes to change the configuration of the cargo container 20.

Figure 5:
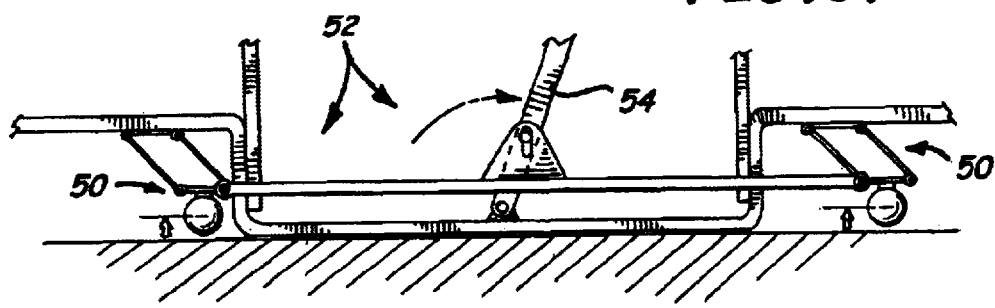
FIG. 5 is a fragmentary side elevational view of a plurality of retractable wheels of a cargo container according to the present invention.

As illustrated in FIG. 5, the cargo container 20 also advantageously includes a plurality of retractable wheels 50. The retractable wheels 50 can advantageously be positioned adjacent a bottom portion 60 of the first 22 and second 24 side frame portions. The retractable wheels 50 can advantageously be casters, for example, or any other type of wheel that can be used to readily maneuver the cargo container 20 in any direction, as understood by those skilled in the art. The plurality of retractable wheels 50 are positioned so that the bottom portion 60 of the first 22 and second 24 side frame portions is spaced apart from a support surface when the plurality of retractable wheels 50 are extended and in contact with a support surface when the plurality of retractable wheels 50 are retracted. For example, the plurality of retractable wheels 50 can be retracted during the loading of the cargo container 20 so that the bottom portion 60 of the first 22 and second 24 side frame portions is positioned in contact with the surface adjacent a loading area. The plurality of retractable wheels 50 can then be extended to maneuver the cargo container 20 about the tarmac, load the cargo container 20 onto a cargo container transporter 70, and into the cargo hold 17 of the aircraft 15. Once the cargo container 20 is positioned in the cargo hold 17 of the aircraft 15, the retractable wheels 50 can advantageously be retracted so that the bottom portion of the first 22 and second side 24 frame portion is positioned in contact with the cargo hold floor.

The first 22 and second 24 side frame portions of the cargo container 20 can advantageously include a friction enhanced bottom portion 62 for minimizing movement of the cargo container when positioned in contact with a support surface. The friction enhanced bottom portion 62 can advantageously include a rubberized portion, such as a rubberized adhesive for example, positioned to contact the bottom portion 62 of the first 22 and second 24 side frame portions. The friction enhanced bottom portion 62 can be positioned in contact with a support surface when the plurality of retractable wheels 50 are positioned in a retracted position and spaced apart from a support surface when the plurality of retractable wheels 50 are positioned in an extended position. The rubberized bottom portion of the first 22 and second 24 side frame portions advantageously minimize movement of the cargo container 20 with great ease and without adding excess weight to the cargo container 20.

As illustrated in FIG. 5, the cargo container 20 further advantageously includes retractable wheel positioning means 52 associated with each of the plurality of retractable wheels 50. The retractable wheel positioning means 52 is positioned adjacent an outer portion of the cargo container 20 for readily positioning each of the plurality of retractable wheels 50 in an extended or retracted position. The retractable wheel positioning means 52 can advantageously include a lever 54. The lever 54 can include an engaged and a disengaged position. The engaged position advantageously positions the plurality of retractable wheels 50 in an extended position and the disengaged position advantageously positions the plurality of retractable wheels 50 in a retracted position. The retractable wheel positioning means 52 advantageously allows the user U of the cargo container 20 to easily retract or extend the retractable wheels 50 in one single motion, i.e., one movement of the lever 54. This advantageously eliminates the time necessary in extending and retracting each of the plurality of retractable wheels 50 individually.

Figure 14:
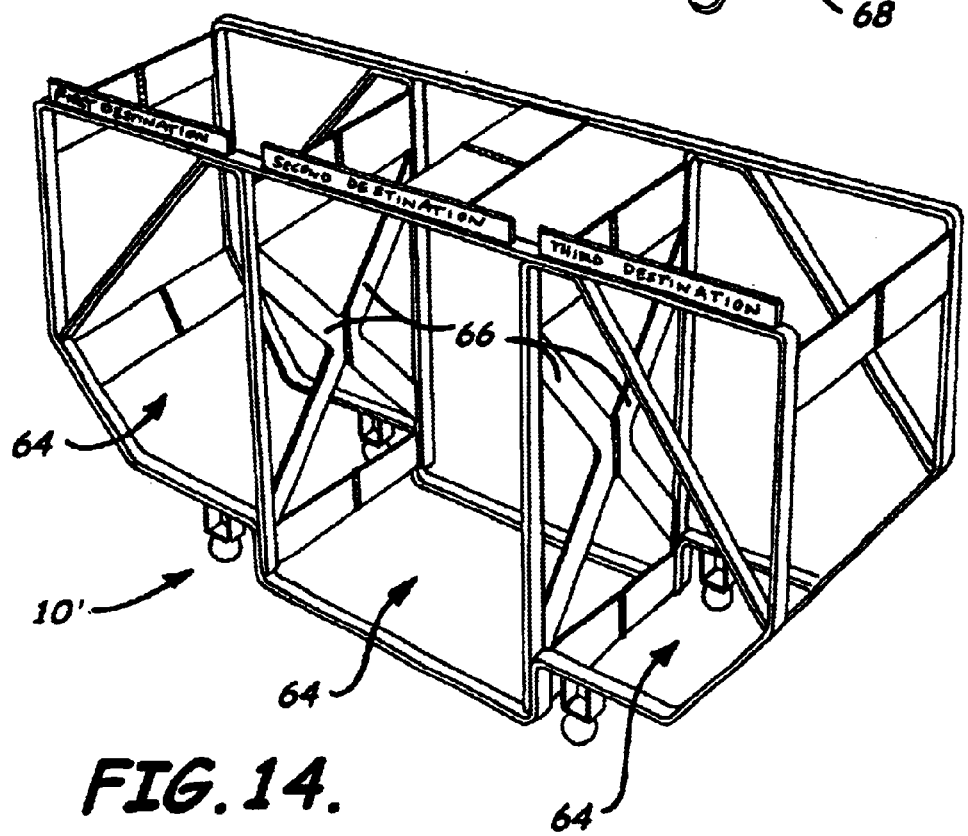
FIG. 14 is a perspective view of a cargo container having a plurality of inner cargo compartments according to the present invention.

As perhaps best illustrated in FIG. 14, the cargo container 20 can advantageously include a plurality of inner cargo compartments 64 positioned therein. The plurality of inner cargo compartments 64 are defined by a plurality of inner side wall frame members 66. The plurality of inner side wall frame members 66 can be made of a plastic material, such as a low density polyethylene material, or any other material having strength properties sufficient to withstand the force exerted by cargo 12 positioned within the cargo container 20. The plurality of inner side wall frame members 66 can also advantageously be collapsible so that the cargo container 20 can be positioned in a collapsed position. The plurality of inner cargo compartments 64 can also be made of the liners. The liners can be positioned to detachably connect to the outer periphery frame members 26 to thereby define a plurality of inner cargo compartments 64.

The plurality of inner cargo compartments 64 of the cargo container 20 can advantageously be organized so that cargo 12 having similar destinations is positioned in similar inner cargo compartments 64. For example, if cargo 12 is to be transported on an aircraft 15 having three different destinations, e.g., Atlanta, Dallas, and Los Angeles, the cargo 12 having a destination of Atlanta can be positioned in one of the plurality of inner cargo compartments 64, the cargo having a destination of Dallas can be positioned in another one of the plurality of inner cargo compartments 64, and the cargo having a destination of Los Angeles can be positioned in yet another one of the plurality of inner cargo compartments 64. This advantageously decreases the time necessary in sorting through and organizing cargo 12 or luggage that must be removed from an aircraft 15 when an aircraft 15 lands. Therefore, the user U of the cargo container 20 in Dallas, for example, can simply empty the cargo positioned in the Dallas cargo 12 compartment, thereby leaving the rest of the cargo 12 undisturbed.

The cargo container 20 also advantageously includes labeling means 36, as illustrated in FIG. 12. The labeling means 36 can advantageously be positioned on the outer portion of the cargo container 20 for labeling the destination of cargo 12 positioned within the cargo container 20. The labeling means 36 can advantageously include a label 37 positioned on the outer portion of the at least one cargo container 20. The label 37 can advantageously include a designation of the destination of the cargo 12 contained in the cargo container 20. The labeling means 36 advantageously eliminates the time required to examine individual labels that may be positioned on each article of luggage, i.e., looking at each individual airline label customarily positioned on articles of luggage that are checked in to determine the destination of each individual article of luggage.

The labeling means 36 can also advantageously include a color code 38 (FIG. 6) positioned on the outer portion of the cargo container 20. The color code 38 can include one of a plurality of colors representing one of a plurality of destinations, i.e., yellow representing Atlanta, blue representing Dallas, and red representing Los Angeles. The color code 38 advantageously allows the user of the cargo containers 20 to determine the destinations of the cargo containers 20 in a time efficient manner.

As illustrated in FIG. 3, the cargo container 20 can advantageously have a shape substantially similar to the shape of an aircraft cargo hold 17. In passenger aircrafts, the aircraft cargo hold 17 is normally positioned in the lower fuselage of the aircrafts 15. In aircrafts 15 that are used solely for cargo 12, however, the cargo hold 17 can be in both the lower and the upper fuselage of the aircraft 15. The lower fuselage of the aircraft 15 includes a bottom portion and a pair of opposing side walls 18 that have a substantially arcuate shape extending from a first preselected height on a first side wall of the cargo hold to a second preselected height on an opposing second side wall of the cargo hold. The first and second side walls 18 are positioned substantially opposite one another. Similarly, the upper fuselage of the aircraft includes a top portion and a pair of opposing side walls 18 that have a substantially arcuate shape extending from a first preselected height on a first side wall of the cargo hold to a second preselected height on an opposing second side wall of the cargo hold.

Figure 13:
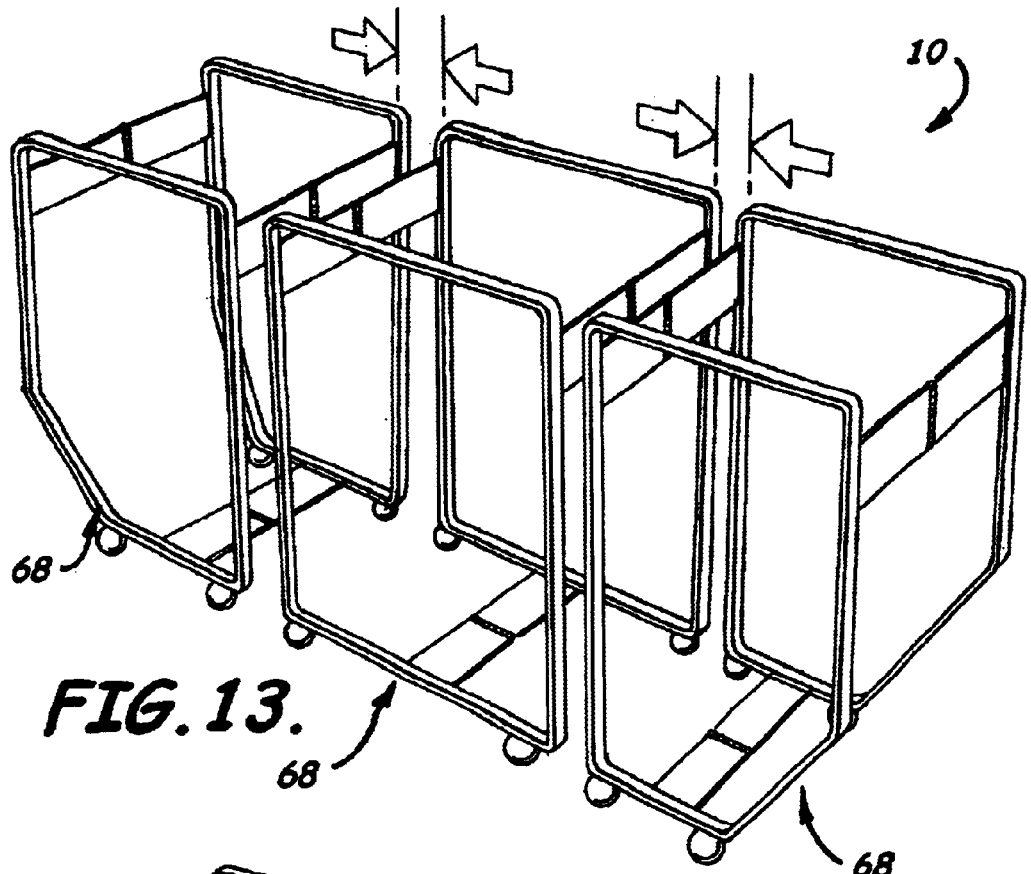
FIG. 13 is a perspective view of plurality of separable cargo containers according to the present invention.

The cargo container 20 can further advantageously include a plurality of separable cargo containers 68, as best illustrated in FIG. 13. The plurality of separable cargo containers 68 can have various shapes. For example, the plurality of separable cargo containers 68 can include two halves, each having a shape substantially similar to half of the cargo hold. Also for example, the plurality of separable cargo containers 68 can include four quarters. Two of the four separable cargo containers 68 can include shapes that can readily fit against the side wall 18 of the aircraft cargo hold, for example, and the other two of the four separable cargo containers 68 can include rectangular shapes that can be positioned between the outer two separable cargo containers. Combined, the separable cargo containers 68 have a shape substantially similar to the shape of the aircraft cargo hold 17 as described above.

Figure 2:
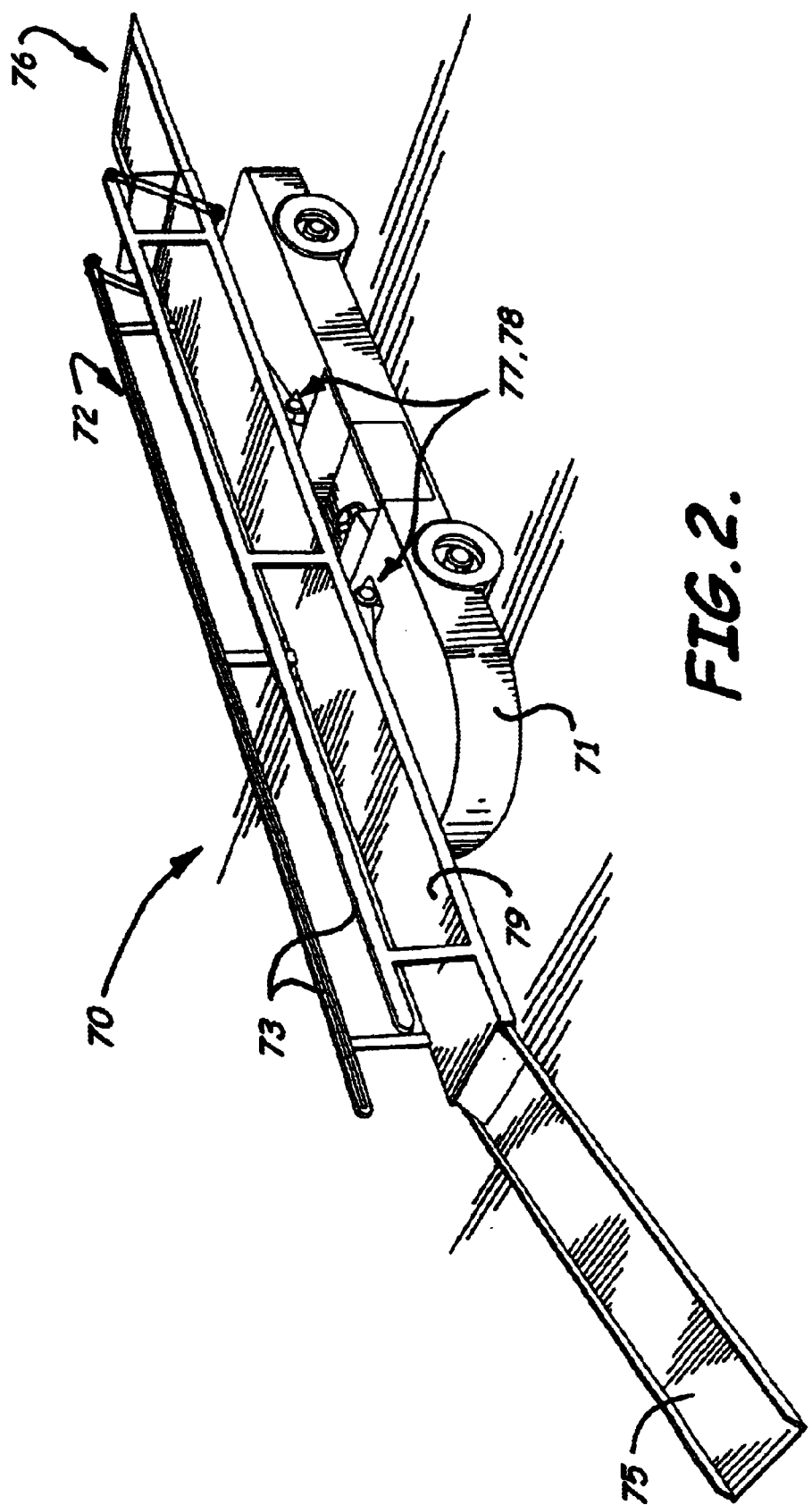
FIG. 2 is a perspective view of a cargo container transporter according to the present invention.

As best illustrated in FIG. 2, the cargo container apparatus and the present invention also includes a cargo container transporter 70 upon which a plurality of cargo containers 20 can be positioned to transport the cargo containers, i.e., between a loading area and an aircraft 15, or between two aircrafts 15. The cargo container transporter 70 includes a base portion. The base portion of the cargo container transporter 70 can advantageously be a wheeled vehicle 71 that is capable of traveling on a tarmac. The cargo container transporter 70 can also advantageously include an elevatable platform 72 having a cargo container support surface 79. The cargo container support surface 79 can advantageously be a smooth surface along which the cargo containers 20 can be transported with ease. A plurality of cargo containers 20 can be positioned on the cargo container support surface 79 for ready transport of the cargo containers 20. The elevatable platform 72 advantageously allows ready elevation of the cargo containers 20 positioned on the cargo container support surface 79 to a level suitable for loading the cargo containers 20 into the aircraft cargo hold 17.

The cargo container transporter 70 can also advantageously include a pair of side support rails 73 extending outwardly from the cargo container support surface 79. Each one of the pair of side support rails 73 are positioned substantially opposite the other one of the pair of side support rails 73. The side support rails 73 can advantageously be aluminum rails, for example, or any other material that has sufficient strength properties to support cargo containers 20 positioned on the cargo container support surface 79.

The cargo container transporter 70 can further advantageously include front 75 and rear 76 ramps positioned to respectively extend outwardly from a front portion and a rear portion of the cargo container support surface 79. The front 75 and rear 76 ramps advantageously provide access to the cargo container support surface 79 for loading and unloading cargo containers 20 onto the cargo container support surface 79. The front 75 and rear 76 ramps also advantageously eliminate added equipment that would otherwise be needed to load the cargo containers 20 onto the cargo container support surface 79, i.e., fork lifts that would be needed to elevate the cargo containers 20 from ground level to the level of the cargo container support surface 79.

The cargo container transporter 70 further includes pivoting means 77. The pivoting means 77 is positioned between the elevatable platform 72 and the wheeled vehicle 71 for pivoting the front or rear portion of the elevatable platform 72 during loading or unloading of the cargo containers 20. Pivoting the elevatable platform 72 advantageously decreases the slope up which the cargo containers 20 must be transported in order to transport the cargo containers 20 from ground level to be positioned on the cargo container support surface 79. Pivoting the elevatable platform 72 also advantageously decreases the slope down which the cargo containers 20 must be transported, thereby allowing the user U to retain more control when loading and unloading the cargo containers 20.

The pivoting means 77 can advantageously be a hinged extension 78 positioned between the wheeled vehicle 71 and the elevatable platform 72. The hinged extension 78 allows the elevatable platform 72 to be pivoted in many directions. For example, the pivoting means 77 can be used to allow the rear portion of the elevatable platform 72 to be pivoted downwardly to allow the cargo containers 20 to be readily loaded or unloaded from the rear of the cargo container transporter 70. Similarly, the pivoting means 77 can be used to allow the front portion of the elevatable platform 72 to be pivoted downwardly to allow the cargo containers 20 to be readily loaded or unloaded from the front of the cargo container transporter 70.

The cargo container support surface 79 of the cargo container transporter 70 can advantageously include conveying means 80 for conveying the cargo containers 20. The conveying means 80 can advantageously be used to load or unload cargo containers 20 into or out of the aircraft cargo hold 17 or to load or unload the cargo containers 20 from ground level onto the cargo container transporter 70. The conveying means 80 can include a conveyor 82 positioned to overlie the elevatable platform 72. The conveyor 82 can be driven and can have various speeds.

As best illustrated in FIG. 1A, the conveying means 80 can also advantageously include a conveyor 82 positioned adjacent each of the side support rails 73 and a conveying fastener 84 detachably connected thereto. The conveyor 82 can advantageously be positioned adjacent an upper portion of the side support rails 73. The cargo containers 20 can be positioned to overlie the cargo container support surface 79 and further be positioned between the side support rails 73. The conveying fastener 84 is positioned to detachably connect to the conveyor 82 on each of the first and second side support rails 73. The conveying fastener 84 can be a belt 85, for example, that is positioned around a side portion of the cargo containers 20 and fastened to the conveyor 82 on each of the first and second side support rails 73. When the conveyor 82 is moved, the cargo containers 20 will be moved by the belt 85 along the cargo container support surface 79.

Figure 1:
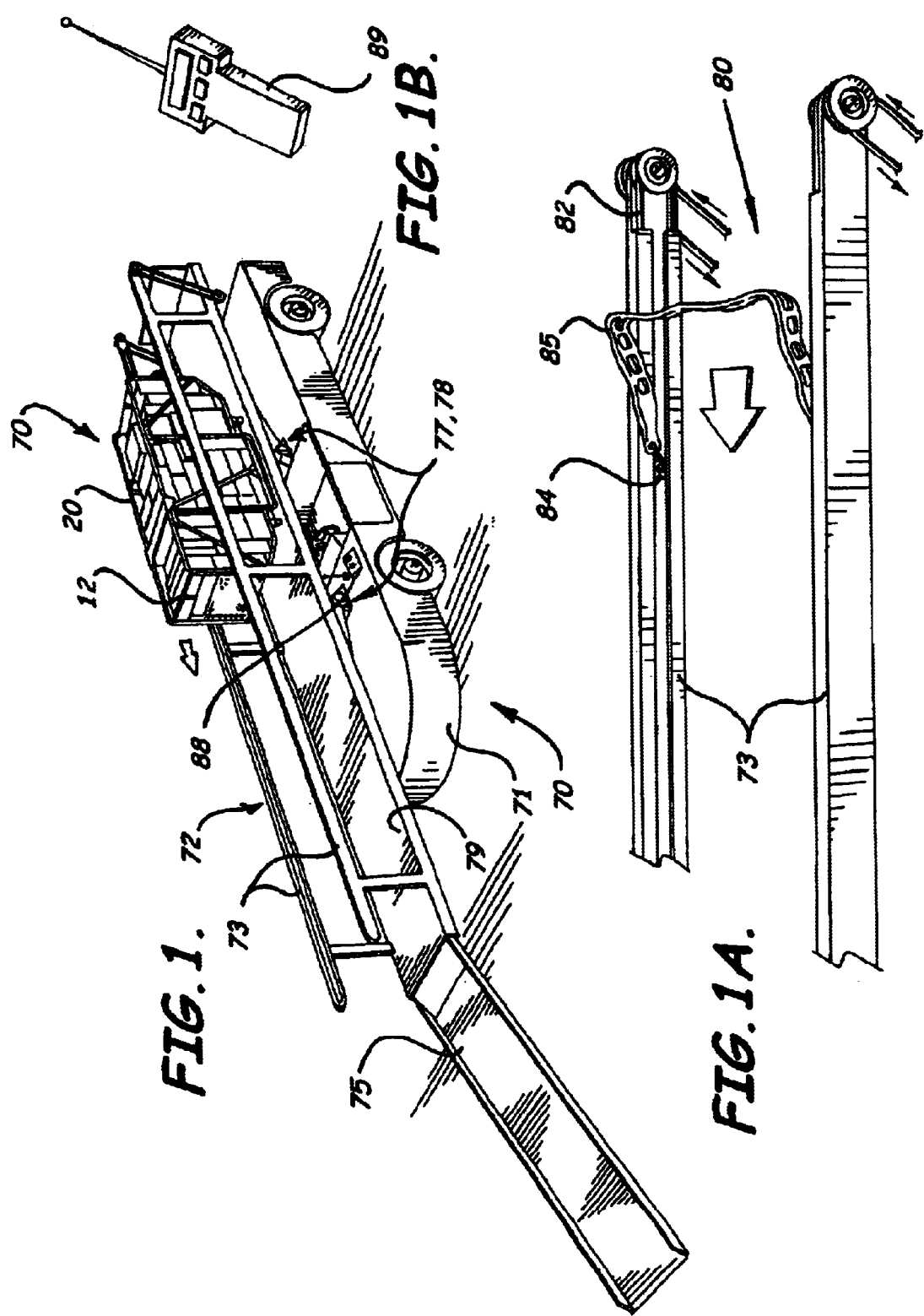
FIG. 1 is a perspective view of cargo transporter with loaded cargo container according to the present invention.

As illustrated in FIGS. 1 and 1B, the conveyor 82 can advantageously be controlled by a conveyor controller 88 positioned on the cargo container transporter 70. The conveyor controller 88 can advantageously control the speed of the conveyor 82 as well as the direction of the conveyor 82, i.e., backwards or forwards. The conveyor 82 can also advantageously be remotely operated so that a user U may control the conveyor 82 at a remote location with a remote control unit 89. For example, a user U positioned in the aircraft cargo hold 17 can advantageously unload the cargo containers 20 onto the conveyor 82 and move the conveyor 82, thereby conveying the cargo containers 20, while still positioned within the aircraft cargo hold 17.

The cargo container transporter 70 can advantageously have a low clearance. A low clearance allows the cargo container transporter 70 to pass below portions of an aircraft 15. This advantageously saves time by eliminating the need for the cargo container transporter 70 to travel around aircraft 15 that are sometimes extremely long.

The present invention also advantageously includes a cargo organization system for transporting cargo 12 in an aircraft cargo hold 17 between a plurality of preselected destinations. The system includes a plurality of cargo containers 20, labeling means 36 and, loading order selecting means 90. Each of the plurality of cargo containers 20 includes one of a plurality of preselected destinations so that cargo 12 having similar destinations can be positioned in one of the plurality of cargo containers 20.

The labeling means 36 can advantageously be positioned on an outer portion of each of the plurality of cargo containers 20 for identifying one of the plurality of preselected destinations of cargo 12 positioned in one of the plurality of cargo containers 20. The labeling means 36 can advantageously include a label 37 having a designation of the destination of the cargo 12 positioned in the cargo container 20, as described in detail above.

Figure 6:
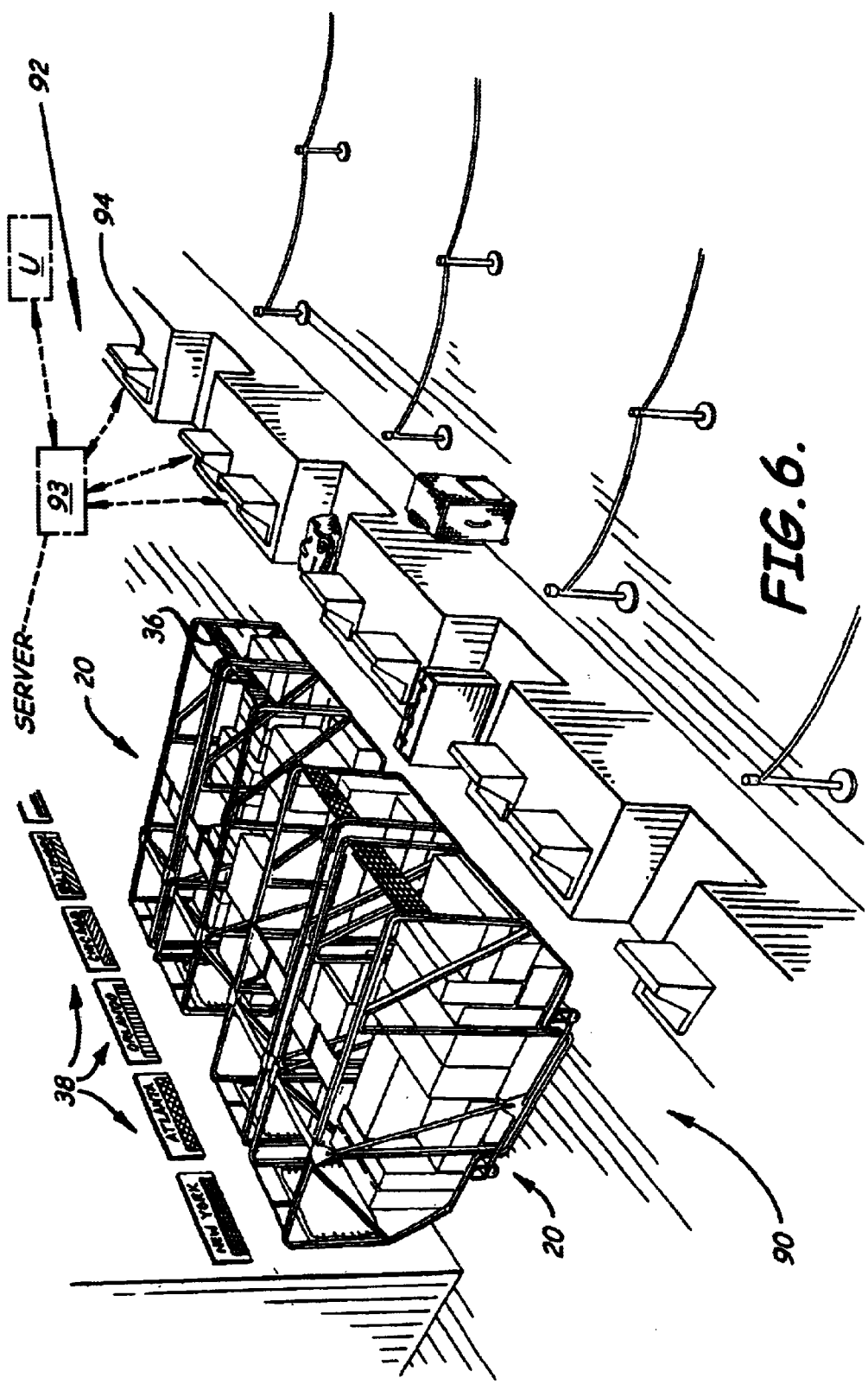
FIG. 6 is an environmental view of a luggage loading area with color coded cargo containers according to the present invention.
Figure 7:
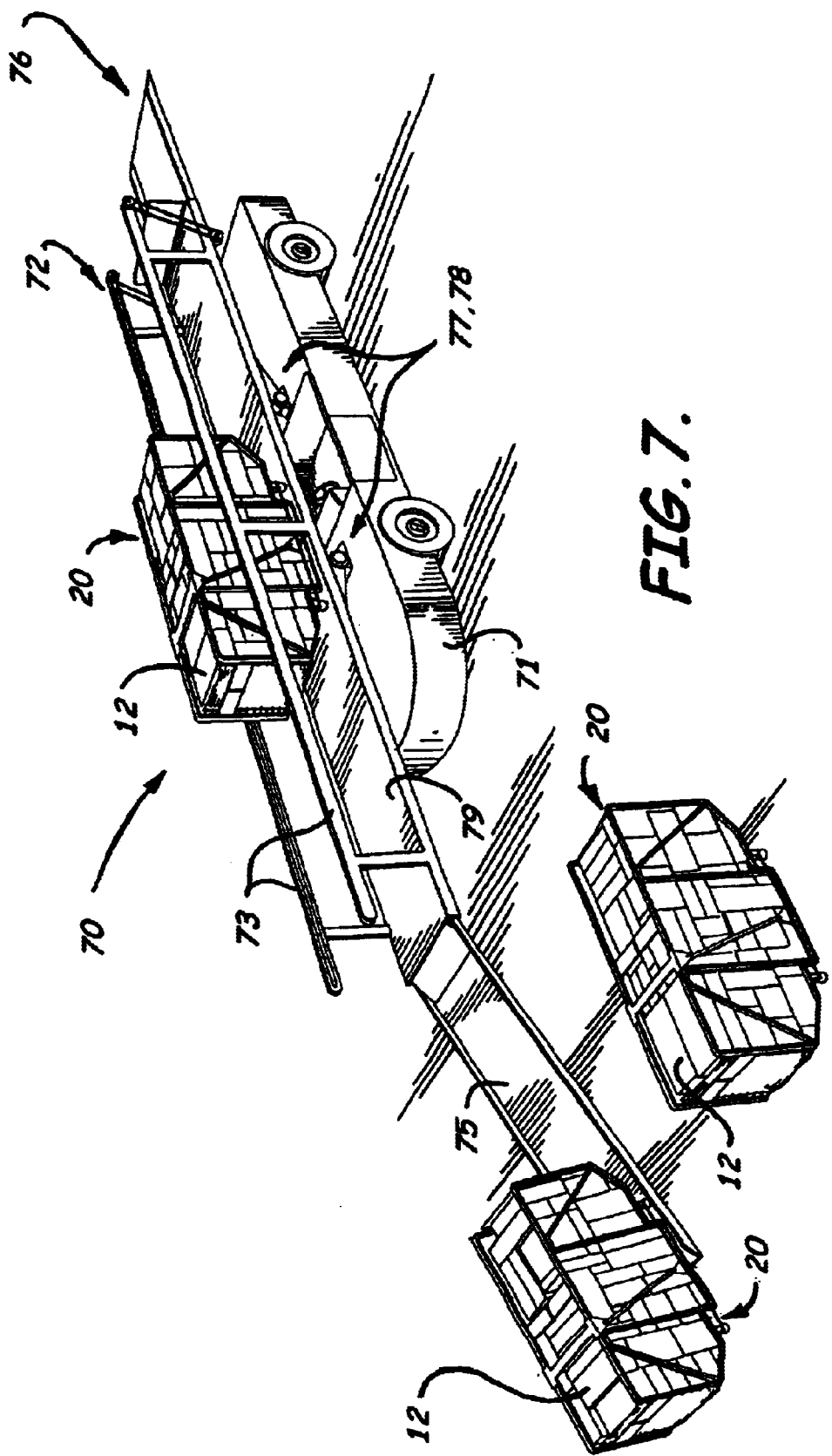
FIG. 7 is a perspective view of a cargo container apparatus according to the present invention.
Figure 8:
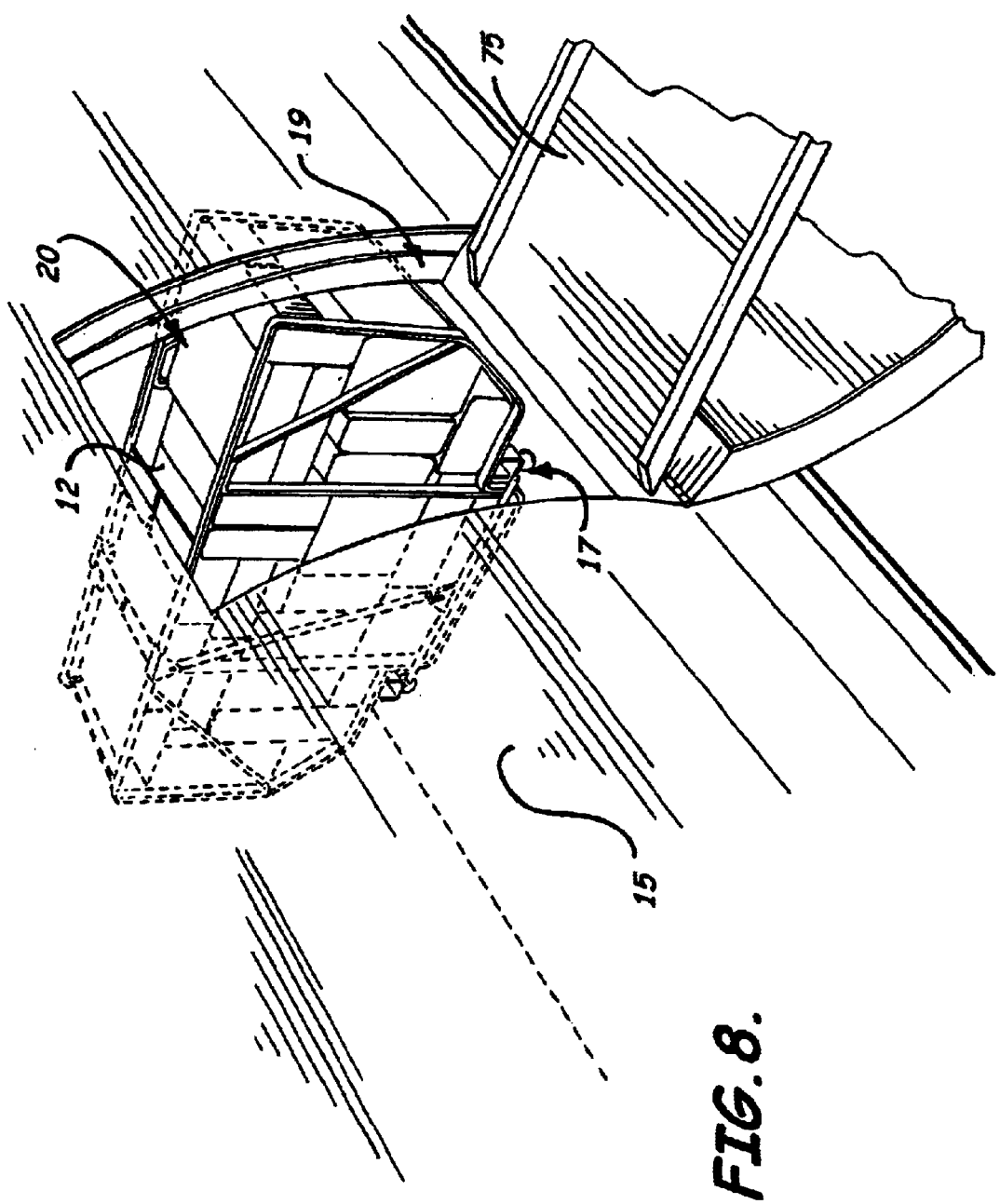
FIG. 8 is a perspective view of a cargo hold of an aircraft with a container loaded therein according to the present invention.

As best illustrated in FIG. 6, the organization system also includes loading order selecting means 90 for selecting the order in which the plurality of cargo containers 20 are to be loaded into the aircraft cargo hold 17. The loading order selecting means 90 can advantageously be a communication system 92 positioned adjacent the aircraft cargo hold 17 for positioning the cargo containers 20 in the cargo hold 17, such as at the stations where the luggage is checked in. The communication system can include a server 93 and a plurality of computers 94 positioned in communication with the server 93. The computers 94 can advantageously be hand-held computers, for example, or wireless communicators that can be readily moved about the aircraft 15 or between the aircraft 15 and the loading area. The communication between each of the computers 94 and the server 93 can, for example, advantageously be a fiber optic communication link, radio frequency, microwave frequency, an infra red communication link, a twisted pair, a satellite communications link, a global positioning system, or any other form of communication as understood by those skilled in the art.

The server 93 can advantageously send a signal to one of the plurality of computers 94 providing the order in which the cargo containers 20 should be loaded into the aircraft cargo hold 17. The loading order of the cargo containers 20 can advantageously be determined based on the itinerary of the aircraft 15. For example, if the aircraft 15 is scheduled to depart from Atlanta, make one stop in Dallas, and arrive in Los Angeles, the cargo containers 20 would be loaded onto the aircraft 15 so that they can be readily unloaded as the aircraft 15 makes each stop. Therefore, the cargo containers 20 having a destination of Los Angeles, the last destination of the aircraft 15, would be loaded onto the aircraft first, and the cargo containers having a final destination of Dallas, the first stop, would be loaded onto the aircraft 15 last. This allows for the Dallas cargo containers to be positioned closer to the aircraft cargo hold access 19. The Dallas cargo containers can then be unloaded from the aircraft 15 without disturbing the Los Angeles cargo containers.

The cargo container organization system can also advantageously include a plurality of separable cargo containers 68, as described in detail above. Each of the separably connected cargo containers 68 can be readily moved within the aircraft cargo hold 17. Using the above example of an aircraft itinerary including a departure from Atlanta, one stop in Dallas, and a final stop in Los Angeles, a cargo container 20 having a final destination of Dallas that was positioned behind a cargo container 20 having a final destination of Los Angeles can be removed from the aircraft by manipulating the separable cargo containers 68 to allow a space for the Dallas cargo container to be taken out of the aircraft cargo hold 17 without the need to unload the Los Angeles cargo containers.

The present invention also advantageously includes methods of transporting cargo in an aircraft cargo hold 17. The methods include the steps of expanding a cargo container 20 from a collapsed position, connecting a liner 40 to a lower portion of the expanded cargo container to form a floor of the expanded cargo container, and loading cargo 12 into the expanded cargo container. The methods of transporting cargo 12 advantageously decrease the time necessary to load and unload cargo onto and off of an aircraft cargo hold 17. The methods also decrease the amount of labor necessary to load and unload cargo 12 from a cargo hold 17.

The methods of transporting cargo 12 further include labeling the expanded cargo container having cargo 12 positioned therein with one of a plurality of predetermined destinations. The step of labeling the cargo container includes assigning one of a plurality of predetermined destinations to the cargo container 20 based on the destination of the cargo 12 positioned therein. The predetermined destination is determined based on the cargo 12 positioned therein. The step of labeling the expanded cargo container further includes printing the predetermined destination on a label 37 and attaching the label 37 to an outer portion of the expanded cargo container.

The methods of transporting cargo 12 still further include loading the expanded cargo container having cargo 12 positioned therein into the cargo hold 17 of the aircraft 15. The step of loading the expanded cargo container into the aircraft cargo hold 17 includes the step of loading the expanded cargo container onto a cargo container transporter 70. The step of loading the cargo container 20 onto the cargo container transporter 70 includes the steps of pivoting portions of the cargo container transporter 70 to readily receive the cargo container 20 and contacting a conveyor 82 with the cargo container 20 to convey the cargo container 20 along portions of the cargo container transporter 70. The step of loading the expanded cargo container into the aircraft cargo hold 17 can further advantageously include pivoting portions of the cargo container transporter 70 in another direction for readily unloading the expanded cargo containers 20 from the cargo container transporter 70 to the aircraft cargo hold 17.

The method of transporting cargo 12 also includes collapsing the expanded cargo container for ready storing after the cargo 12 has been removed from the expanded cargo container. The collapsed cargo containers can be stored in the aircraft cargo hold 17, or in a storage area adjacent a loading area.

The present invention also includes methods of organizing cargo in an aircraft cargo hold 17. The method includes the step of loading cargo 12 having similar destinations into one of a plurality of cargo containers 20 and labeling each of the plurality of cargo containers 20 with one of a plurality of preselected destinations. The method of organizing cargo 12 further includes organizing each of the plurality of cargo containers 20 having a preselected destination into an order to be loaded into the aircraft cargo hold 17 that is substantially opposite to the order of the destinations of the aircraft 15. For example, if the aircraft is to travel from Atlanta, to Dallas, to Phoenix, then land in Los Angeles, the cargo containers 20 having a destination of Los Angeles would be loaded first, followed by the cargo containers 20 having a destination of Phoenix, followed by the cargo containers 20 having a destination of Los Angeles. This advantageously allows cargo containers 20 to be readily unloaded from the aircraft 15 without the need to unload other cargo containers 20 positioned ahead of the cargo containers 20 that need to be unloaded. This advantageously enhances time efficiency of loading and unloading of aircraft cargo 12.

The method of organizing cargo 12 also includes loading cargo 12 having similar destinations into a similar one of a plurality of compartments in a cargo container 20. This advantageously allows ready unloading of cargo 12 having similar destinations, as the cargo 12 will all be located together.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That claimed is:

1. A cargo container apparatus for arranging cargo in a cargo hold, the apparatus comprising:

at least one cargo container having a first side frame portion and a second side frame portion positioned substantially opposite the first side frame portion, the first and second side frame portions including a plurality of outer periphery frame members and a plurality of inner frame brace members positioned to connect to the plurality of outer periphery frame members, the first and second side frame portions being connected by a plurality of connecting members, the plurality of connecting members positioned to connect the first and second side frame portions so that the first and second side frame portions are positioned spaced-apart and substantially parallel, the cargo container also comprising a plurality of liners positioned to detachably connect to the plurality of outer periphery frame members of the first and second side frame portions, the plurality of liners comprising a first plurality of liners positioned to detachably connect to the plurality of outer periphery frame members and overlie the plurality of connecting members to thereby form a floor of the at least one cargo container, and further comprising a second plurality of liners positioned to detachably connect to the plurality of outer periphery frame members and overlie the plurality of inner frame brace members to thereby form wall portions of the at least one cargo container; and a cargo container transporter having a base portion and an elevatable platform positioned thereon, the base portion including a wheeled vehicle, the elevatable platform including a cargo container support surface, a pair of side support rails extending outwardly from the cargo container support surface, each one of the pair of side support rails positioned substantially opposite the other one of the pair of side support rails, and front and rear ramps positioned to respectively extend outwardly from a front portion and a rear portion of the cargo container support surface.

2. The cargo container apparatus as defined in claim 1, wherein the at least one cargo container is a collapsible cargo container and wherein the plurality of connecting members are collapsible connecting members positioned to collapsibly connect the first and second side frame portions so that the first and second side frame portions can be positioned a first predetermined distance apart when the plurality of collapsible connecting members are in an extended position and a second predetermined distance apart when the plurality of collapsible connecting members are in a collapsed position.

3. The cargo container apparatus as defined in claim 2, wherein the plurality of collapsible connecting members each include a hinge having a released position so that each of the plurality of collapsible connecting members are folded upwardly, thereby allowing the cargo container to be collapsed and in a locked position so that each of the plurality of collapsible connecting members are un-folded, thereby allowing the cargo container to be extended.

4. The cargo container apparatus as defined in claim 1, wherein the at least one cargo container further comprises a plurality of retractable wheels positioned adjacent a bottom portion of the first and second side frame portions so that the bottom portion of the first and second side frame portions is spaced apart from a support surface when the plurality of retractable wheels are extended and in contact with a support surface when the plurality of retractable wheels are retracted.

5. The cargo container apparatus as defined in claim 4, wherein the first and second side frame portions of the at least one cargo container include a friction enhanced bottom portion for minimizing movement of the at least one cargo container when positioned in contact with a support surface, the friction enhanced bottom portion positioned in contact with a support surface when the plurality of retractable wheels are positioned in a retracted position and spaced apart from a support surface when the plurality of retractable wheels are positioned in an extended position.

6. The cargo container apparatus as defined in claim 5, wherein the at least one cargo container further comprises retractable wheel positioning means associated with each of the plurality of retractable wheels and positioned adjacent an outer portion of the at least one cargo container for readily positioning each of the plurality of retractable wheels in an extended or retracted position.

7. The cargo container apparatus as defined in claim 6, wherein the retractable wheel positioning means is a lever that includes an engaged position having the retractable wheels extended and a disengaged position having the retractable wheels retracted.

8. The cargo container apparatus as defined in claim 7, wherein the cargo container transporter further comprises pivoting means positioned between the elevatable platform and the wheeled vehicle for pivoting the front or rear portion of the elevatable platform during loading or unloading of the at least one cargo container.

9. The cargo container apparatus as defined in claim 8, wherein the cargo container transporter further comprises cargo container conveying means positioned on the elevatable platform for conveying the at least one cargo container along portions of the elevatable platform.

10. The cargo container apparatus as defined in claim 9, wherein the at least one cargo container further comprises a plurality of inner side wall frame members defining a plurality of inner cargo compartments positioned within the at least one cargo container, the plurality of inner cargo compartments organized so that cargo having similar destinations is positioned in a similar one of the plurality of inner cargo compartments.

11. The cargo container apparatus as defined in claim 9, wherein the at least one cargo container further comprises labeling means positioned on the outer portion of the at least one cargo container for labeling the destination of cargo positioned within the at least one cargo container.

12. The cargo container apparatus as defined in claim 11, wherein the labeling means comprises a label positioned on the outer portion of the at least one cargo container, the label including a designation of the destination of the cargo contained within the cargo container.

13. The cargo container apparatus as defined in claim 11, wherein the labeling-means comprises a color code positioned on the outer portion of the cargo container, the color code including a designation of one of a plurality of colors associated with one of a plurality of destinations.

14. The cargo container apparatus as defined in claim 1, wherein the first and second side frame portions of the at least one cargo container have a shape substantially similar to the shape of the cargo hold, the cargo hold including a bottom portion and a pair of opposing side walls that have a substantially arcuate shape extending from a first preselected height on a first side wall of the cargo hold to a second preselected height on an opposing second side wall of the cargo hold positioned substantially opposite the first side wall of the cargo hold.

15. The cargo container apparatus as defined in claim 14, wherein the at least one cargo container includes a plurality of separable cargo containers having various shapes, the plurality of separable cargo containers being separably connected to form the at least one cargo container having a shape substantially similar to the shape of the cargo hold.

16. A cargo container apparatus for arranging cargo in a cargo hold of an aircraft, the apparatus comprising:

at least one cargo container having a first side frame portion and a second side frame portion positioned substantially opposite the first side frame portion, the first and second side frame portions including a plurality of outer periphery frame members, a plurality of inner frame brace members positioned to connect to the plurality of outer periphery frame members, and being collapsibly connected by a plurality of collapsible connecting members so that the first and second side frame portions are connected a first predetermined distance apart when the collapsible connecting members are in an extended position and a second predetermined distance apart when the collapsible connecting members are in a collapsed position; and a cargo container transporter for transporting the at least one cargo container, the cargo container transporter having a base portion and an elevatable platform positioned thereon, the base portion including a wheeled vehicle, and the elevatable platform including a cargo container support surface.

17. The cargo container apparatus as defined in claim 16, wherein the plurality of collapsible connecting members each include a hinge having a released position so that each of the plurality of collapsible connecting members are folded upwardly, thereby allowing the cargo container to be collapsed and in a locked position so that each of the plurality of collapsible connecting members are un-folded, thereby allowing the cargo container to be extended.

18. The cargo container apparatus as defined in claim 17, wherein the at least one cargo container further comprises a plurality of retractable wheels positioned adjacent a bottom portion of the first and second side frame portions so that the bottom portion of the first and second side frame portions is positioned spaced apart from a support surface when the plurality of retractable wheels are extended and in contact with a support surface when the plurality of retractable wheels are retracted.

19. The cargo container apparatus as defined in claim 18, wherein the at least one cargo container further comprises retractable wheel positioning means associated with each of the plurality of retractable wheels and positioned along an outer portion of the at least one cargo container for retracting and extending each of the plurality of retractable wheels.

20. The cargo container apparatus as defined in claim 19, wherein the retractable wheel positioning means is a lever that includes an engaged position having the retractable wheels extended and a disengaged position having the retractable wheels retracted.

21. The cargo container apparatus as defined in claim 20, wherein the bottom portion of the first and second side frame portions is a friction enhanced bottom portion and, wherein the friction enhanced bottom portion is positioned in contact with a support surface when the plurality of retractable wheels are positioned in a retracted position and spaced apart from a support surface when the plurality of retractable wheels are positioned in an extended position.

22. The cargo container apparatus as defined in claim 21, wherein the at least one cargo container further comprises a plurality of liners positioned to detachably connect to the plurality of outer periphery frame members of the first and second side frame portions, the plurality of liners comprising a first plurality of liners positioned to detachably connect to the plurality of outer periphery frame members and overlie the plurality of collapsible connecting members to thereby form a floor of the at least one cargo container, and a second plurality of liners positioned to detachably connect to the plurality of outer periphery frame members and overlie the plurality of inner frame brace members to thereby form wall portions of the at least one cargo container.

23. The cargo container apparatus as defined in claim 22, wherein the cargo container transporter further comprises a pair of side support rails extending outwardly from the cargo container support surface, each one of the pair of side support rails positioned substantially opposite the other one of the pair of side support rails, and wherein the cargo container transporter further comprises front and rear ramps positioned to respectively extend outwardly from a front portion and a rear portion of the cargo container support surface.

24. The cargo container apparatus as defined in claim 23, wherein the cargo container transporter further comprises pivoting means positioned between the elevatable platform and the wheeled vehicle for pivoting the front or rear portion of the elevatable platform during loading or unloading of the at least one cargo container.

25. The cargo container apparatus as defined in claim 24, wherein the at least one cargo container a transporter further comprises cargo container conveying means positioned on the elevatable platform for conveying the at least one cargo container along portions of the elevatable platform.

26. The cargo container apparatus as defined in claim 25, wherein the at least one cargo container further comprises a plurality of inner side wall frame members defining a plurality of inner cargo compartments positioned within the at least one cargo container, the plurality of inner cargo compartments organized so that cargo having similar destinations is positioned in a similar one of the plurality of inner cargo compartments.

27. The cargo container apparatus as defined in claim 25, wherein the at least one cargo container further comprises labeling means positioned on the outer portion of the at least one cargo container for labeling the destination of cargo positioned within the at least one cargo container.

28. The cargo container apparatus as defined in claim 27, wherein the labeling means comprises a label positioned on the outer portion of the at least one cargo container, the label including a designation of the destination of the cargo contained within the cargo container.

29. The cargo container apparatus as defined in claim 16, wherein the first and second side frame portions of the at least one cargo container have a shape substantially similar to the shape of the cargo hold, the cargo hold including a bottom portion and a pair of opposing side walls that have a substantially arcuate shape extending from a first preselected height on a first side wall of the cargo hold to a second preselected height on an opposing second side wall of the cargo hold positioned substantially opposite the first side wall of the cargo hold.

30. The cargo container apparatus as defined in claim 29, wherein the at least one cargo container includes a plurality of separable cargo containers having various shapes, the plurality of separable cargo containers being separably connected to form the at least one cargo container having a shape substantially similar to the shape of the cargo hold.

31. A cargo container for storing cargo in a cargo hold and for transporting cargo between preselected locations, the cargo container comprising:

a first side frame portion having a first plurality of outer periphery frame members;

a second side frame portion having a second plurality of outer periphery frame members and positioned a predetermined distance spaced apart from and substantially opposite the first side frame portion;

a plurality of inner frame brace members positioned to connect to the outer periphery frame members of the first and second side frame portions;

a plurality of connecting members positioned to connect the first and second side frame portions along portions of the plurality of outer periphery frame members of the first and second side frame portions so that the first and second side frame portions are positioned spaced apart and substantially parallel;

at least one liner positioned to detachably connect the at least one liner to the plurality of outer periphery frame members and overlie the plurality of connecting members to thereby form a floor positioned between the first and second side frame portions to support cargo positioned in the cargo container;

at least one fastener associated with each of said at least one liner positioned to detachably connect said at least one liner to the plurality of outer periphery frame members to form the floor; and a plurality of wheels positioned adjacent a bottom portion of the first and second side frame portions to allow the cargo container to be rolled while transporting cargo between said preselected locations.

32. The cargo container as defined in claim 31, wherein said at least one liner comprises a first liner that detachably connects to the plurality of outer periphery frame members with said at least one fastener to form the floor, and a second liner that detachably connects to the plurality of outer periphery frame members of the first and second side frame portions and to overlie the plurality of inner frame brace members with said at least one fastener to thereby form wall portions of the cargo container.

33. The cargo container as defined in claim 32, wherein the plurality of connecting members are collapsible connecting members positioned to collapsibly connect the first and second side frame portions so that the first and second side frame portions can be positioned a first predetermined distance apart when the plurality of collapsible connecting members are in an extended position, and a second predetermined distance apart when the plurality of connecting members are in a collapsed position.

34. The cargo container as defined in claim 33, wherein the plurality of collapsible connecting members each include a hinge having a released position wherein each of the plurality of collapsible connecting members are folded upwardly thereby allowing the cargo container to be collapsed, and a locked position wherein each of the plurality of collapsible connecting members are unfolded, thereby allowing the cargo container to be extended.

35. The cargo container as defined in claim 34, wherein said plurality of wheels comprise a plurality of retractable wheels so that the bottom portion of the first and second side frame portions is spaced apart from a support surface when the plurality of retractable wheels are extended and in contact with a support surface when the plurality of retractable wheels are retracted.

36. The cargo container as defined in claim 35, further comprising retractable wheel positioning means associated with each of the plurality of retractable wheels and positioned adjacent an outer portion of the cargo container for retracting and extending each of the plurality of retractable wheels.

37. The cargo container as defined in claim 36, wherein the means is a lever that includes an engaged position having the retractable wheels extended, and a disengaged position having the retractable wheels retracted.

38. The cargo container as defined in claim 37, wherein the bottom portion of the first and second side frame portions is a friction enhanced bottom portion and wherein the friction enhanced bottom portion is positioned in contact with a support surface when the plurality of retractable wheels are positioned in a retracted position, and spaced apart from a support surface when the plurality of retractable wheels are positioned in an extended position.

39. The cargo container as defined in claim 38, further comprising a plurality of inner side wall frame members defining a plurality of inner cargo compartments positioned within the cargo container, the plurality of inner cargo compartments organized so that cargo having similar destinations is positioned in a similar one of the plurality of inner cargo compartments.

40. The cargo container as defined in claim 31, further comprising labeling means positioned on an outer portion of the cargo container for labeling the destination of cargo positioned within the cargo container.

41. The cargo container as defined in claim 40, wherein the labeling means comprises a label positioned on the outer portion of the cargo container, the label including a designation of the destination of cargo positioned within the cargo container.

42. The cargo container as defined in claim 40, wherein the labeling means comprises a color code positioned on the outer portion of the cargo container, the color code including a designation of one of a plurality of colors associated with one of a plurality of destinations.

43. The cargo container as defined in claim 31, wherein the first and second side frame portions have a shape substantially similar to the shape of a cargo hold, the cargo hold including a bottom portion and a pair of opposing side walls that have a substantially arcuate shape extending from a first preselected height on a first side wall of the cargo hold to a second preselected height on an opposing second side wall of the cargo hold positioned substantially opposite the first side wall of the cargo hold.

44. The cargo container as defined in claim 43, further comprising a plurality of separable cargo containers having various shapes, the plurality of separable cargo containers being, separably connected to form a cargo container having a shape substantially similar to the shape of the cargo hold.

45. A cargo container for storing cargo in a cargo hold and for transporting cargo between preselected locations, the cargo container comprising:
   a first side frame portion having a first plurality of outer periphery frame members and extending substantially upwardly from a support surface;
   a second side frame portion having a second plurality of outer periphery frame members and extending substantially upwardly from the support surface and positioned a predetermined distance spaced apart from and substantially opposite the first side frame portion;
   a plurality of inner frame brace members positioned to connect to the outer periphery frame members of the first and second side frame portions; and
   a plurality of collapsible connecting members positioned to collapsibly connect the first and second side frame portions along portions of the outer periphery frame members of the first and second side frame portions so that the predetermined distance between the first and second side frame portions can be varied between a first predetermined distance having the collapsible connecting members in an extended position with the upper end of the cargo container being substantially open, and a second predetermined position having the collapsible connecting members in a collapsed position.

46. The cargo container as defined in claim 45, wherein the plurality of collapsible connecting members each include a hinge having a released position so that each of the plurality of collapsible connecting members are folded upwardly thereby allowing the cargo container to be collapsed and a locked position so that each of the plurality of collapsible connecting members are unfolded thereby allowing the cargo container to be extended.

47. The cargo container as defined in claim 46, further comprising a plurality of retractable wheels positioned adjacent a bottom portion of the first and second side frame portions so that the bottom portion of the first and second side frame portions is spaced apart from a support surface when the plurality of retractable wheels are extended and in contact with a support surface when the plurality of retractable wheels are retracted.

48. The cargo container as defined in claim 47, further comprising a first liner positioned to detachably connect to the plurality of outer periphery frame members and overlie the plurality of collapsible connecting members to thereby form a floor between the first and second side frame portions to support cargo positioned in the cargo container, and a second liner positioned to detachably connect to the members and to overlie the plurality of frame brace members to thereby form wall portions of the cargo container.

49. The cargo container as defined in claim 48, further comprising retractable wheel positioning means associated with each of the plurality of retractable wheels and positioned adjacent an outer portion of the cargo container for retracting and extending each of the plurality of retractable wheels.

50. The cargo container as defined in claim 49, wherein the retractable wheel positioning means is a lever that includes an engaged position having the retractable wheels extended, and a disengaged position having the retractable wheels retracted.

51. The cargo container as defined in claim 50, wherein the bottom portion of the first and second side frame portions is a friction enhanced bottom portion, and wherein the friction enhanced bottom portion of the first and second side frame portions is positioned in contact with a support surface when the plurality of retractable wheels are positioned in a retracted position and spaced-apart from a support surface when the plurality of retractable wheels are positioned in an extended position.

52. The cargo container as defined in claim 51, further comprising a plurality of inner side wall frame members defining a plurality of inner cargo compartments positioned within the cargo container, the inner cargo compartments organized so that cargo having similar destinations is positioned in a similar one of the plurality of inner cargo compartments.

53. The cargo container as defined in claim 45, further comprising labeling means positioned on an outer portion of the cargo container for labeling the destination of cargo positioned within the cargo container.

54. The cargo container as defined in claim 53, wherein the labeling means comprises a label positioned on the outer portion of the cargo container, the label including a designation of the destination of cargo positioned within the cargo container.

55. The cargo container as defined in claim 45, wherein the first and second side frame portions have a shape substantially similar to the shape of a cargo hold, the cargo hold including a bottom portion and a pair of opposing side walls that have a substantially arcuate shape extending from a first preselected height on a first side wall of the cargo container to a second preselected height on an opposing second side wall of the cargo hold positioned substantially opposite the first side wall of the cargo hold.

56. The cargo container as defined in claim 55, further comprising a plurality of separable cargo containers having various shapes, the plurality of separable cargo containers being separably connected to form a cargo container having a shape substantially similar to the shape of a cargo hold.

57. A cargo container transporter for loading at least one cargo container onto an aircraft and for unloading at least one cargo container off an aircraft, the cargo container transport apparatus comprising:
- a wheeled vehicle base portion;
- an elevatable platform positioned to overlie the wheeled vehicle portion and having a proximal portion and a distal portion;
- a cargo container support surface having conveying means positioned adjacent the elevatable platform for conveying the at least one cargo container into and out of the aircraft;
- pivoting means positioned between the elevatable platform and the wheeled vehicle for selectively pivoting the proximal portion or rear the distal portion of the elevatable platform during loading or unloading of the at least one cargo container onto or off the elevatable platform;
- a proximal ramp connected to the elevatable platform and positioned to extend outwardly from the proximal portion of the cargo container support surface; and
- a distal ramp connected to the elevatable platform and positioned to extend outwardly from the distal portion of the cargo container support surface.

58. The cargo container transporter as defined in claim 57, further comprising a pair of side support rails extending outwardly from the cargo container support surface, each one of the pair of side support rails positioned substantially opposite the other one of the pair of side support rails.

59. The cargo container, transporter as defined in claim 58, wherein the conveying means further comprises a conveyor connected to the side support rails for conveying the at least one cargo container along the side support rails and into and out of an aircraft cargo hold.

60. The cargo container transporter as defined in claim 59, wherein the pair of side support rails open at the proximal end and at the distal end so that the cargo containers can be loaded from one of the proximal or distal ramps onto the container support surface and then unloaded to the other of the proximal or distal ramps.

61. The cargo container transporter as defined in claim 60, wherein the pivoting means is a hinged extension positioned between the wheeled vehicle and the elevatable platform to pivot the elevatable platform so that the distal portion of the elevatable platform can be pivoted downwardly to allow the at least one cargo container to be readily loaded onto or unloaded off of the elevatable platform from ground level and the proximal portion of the elevatable platform can be pivoted downwardly so that the at least one cargo container can be readily loaded onto or unloaded off of the elevatable platform from the cargo hold of an aircraft.

62. A cargo organization system for transporting cargo in an aircraft cargo hold between a plurality of preselected destinations, the system comprising:
- a plurality of cargo containers, each one of the plurality of cargo containers having one of a plurality of preselected destinations so that cargo having similar destinations can be positioned in one of the plurality of cargo containers;
- labeling means positioned on an outer portion of each of the plurality of cargo containers for identifying one of the plurality of preselected destinations of cargo positioned in one of the plurality of cargo containers, the labeling means including a label positioned on the outer portion of each of the plurality of cargo containers and a color code positioned on the outer portion of the cargo container, the label including a designation of one of the preselected destinations of the cargo positioned in one of the plurality of cargo containers and a designation of the aircraft into which each of the plurality of cargo containers is to be positioned, the color code including a designation of one of the plurality of preselected destinations of one of the plurality of cargo containers; and
- loading order selecting means for selecting the order in which the plurality of cargo containers are to be loaded into the aircraft cargo hold.

63. The cargo container organization system as defined in claim 62, wherein the loading order selecting means is a communication system positioned adjacent the aircraft cargo hold, the communication system providing preselected load order for each of the plurality of cargo containers that is substantially similar to the itinerary of the aircraft onto which the plurality of cargo containers is to be loaded so that cargo containers having a destination similar to the last destination of the aircraft are loaded first and cargo containers having a destination similar to the first destination of the aircraft are loaded last, thereby making the cargo containers having a destination similar to the first destination of the aircraft readily accessible for unloading.

64. The cargo container organization system as defined in claim 62, wherein each of the plurality of cargo containers further comprises a plurality of separably connected cargo containers having various shapes, the plurality of separably connected cargo containers combining to form a single cargo container having a shape substantially similar to the shape of the aircraft cargo hold, each one of the plurality of separably connected cargo containers being readily moveable within the aircraft cargo hold to thereby allow the unloading of one of the plurality of separably connected cargo containers without the need to unload another one of the plurality of separably connected cargo container positioned between the separably connected cargo container and an access to the aircraft cargo hold so that one of the plurality of separably connected cargo containers can accommodate cargo having a destination that is different from another one of the plurality of cargo containers.

65. A method of organizing cargo in an aircraft cargo hold, the method comprising the steps of:
- labeling a plurality of cargo with information including destination of the cargo;
- loading a portion of the plurality of cargo having a similar destination into a first cargo container;
- loading another portion of the plurality of cargo having another similar destination into a second cargo container, each of the first and second cargo containers having a plurality of retractable wheels positioned adjacent a bottom portion thereof to roll the first and second cargo containers on a support surface;
- labeling each of the first and second cargo containers with one of a first or second preselected destination;
- organizing each of the first and second cargo containers having the first and second preselected destinations into an order to be loaded into the aircraft cargo hold that is substantially opposite to the order the aircraft arrives at the first and second destinations;
- loading the first and second cargo containers having the first and second preselected destinations into the aircraft cargo hold in the order substantially opposite to the order the aircraft arrives at the first and second destinations so that at the first destination the first cargo container can be unloaded from the cargo hold without having to substantially move the second cargo container to unload the first cargo container; and retracting the retractable wheels of at least one of the first and second cargo containers once the at least one of the first and second cargo containers is in the aircraft cargo hold.

66. The method of organizing cargo as defined in claim 65, further comprising:

providing the bottom portion of the first and second side frame portions of the cargo container is a friction enhanced bottom portion; and then inhibiting slippage once the cargo container is loaded into the cargo hold by positioning the friction enhanced bottom portion in contact with the cargo hold.

67. The method of organizing cargo as defined in claim 66, further comprising loading cargo, having a similar destination into one of a plurality of compartments of a cargo container so that cargo having similar destinations are organized into similar, compartments within the cargo container.

68. A cargo container for storing cargo in a cargo hold and for transporting cargo between preselected locations, the cargo container comprising:

a first side frame portion having a first plurality of outer periphery frame members;

a second side frame portion having a second plurality of outer periphery frame members and positioned a predetermined distance spaced apart from and substantially opposite the first side frame portion;

a plurality of inner frame brace members positioned to connect to the outer periphery frame members of the first and second side frame portions;

a plurality of connecting members positioned to connect the first and second side frame portions along portions of the plurality of outer periphery frame members of the first and second side frame portions so that the first and second side frame portions are positioned spaced apart and substantially parallel;

a first at least one liner positioned to detachably connect to the plurality of outer periphery frame members and overlie the plurality of connecting members to thereby form a floor positioned between the first and second side frame positions to support cargo positioned in the cargo container;

a second at least one liner positioned to detachably connect to the plurality of outer periphery frame members of the first and second side frame portions and to overlie the plurality of inner frame brace members to thereby form wall portions of the cargo container; and the plurality of connecting members are collapsible connecting members positioned to collapsibly connect the first and second side frame portions so that the first and second side frame portions can be positioned a first predetermined distance apart when the plurality of collapsible connecting members are in an extended position, and a second predetermined distance apart when the plurality of connecting members are in a collapsed position.

69. The cargo container as defined in claim 68, further comprising a plurality of wheels positioned on the first and second side frame portions so that the cargo container can be rolled on the wheels from one location to another.

70. The cargo container as defined in claim 69, wherein a first at least one fastener detachably connect the first at least one liner to the plurality of outer periphery frame members and overlie the plurality of connecting members to thereby form the floor, and a second a second at least one fastener detachably connect the second at least one liner to the plurality of outer periphery frame members and overlie the plurality of connecting members to thereby form the wall portions of the cargo container.

71. A cargo container for storing in a cargo hold and for transporting cargo between preselected locations, the cargo container comprising:

a first side frame portion having a first plurality of outer periphery frame members;

a second side frame portion having a second plurality of outer periphery frame members and positioned a predetermined distance spaced apart from and substantially opposite the first side frame portion;

a plurality of inner frame brace members positioned to connect to the outer periphery frame members of the first and second side frame portions;

a plurality of collapsible connecting members positioned to collapsibly connect the first and second side frame portions along portions of the outer periphery frame members of the first and second side frame portions so that the predetermined distance between the first and second side frame portions can be varied between a first predetermined distance having the collapsible connecting members in an extended position, and a second predetermined position having the collapsible connecting members in a collapsed position; and the first and second side frame portions have a shape substantially similar to the shape of a cargo hold, the cargo hold including a bottom portion and a pair of opposing side walls that have a substantially arcuate shape extending from a first preselected height on a first side wall of the cargo container to a second preselected height on an opposing second side wall of the cargo hold positioned substantially opposite the first side wall of the cargo hold.

72. A cargo container transporter for loading at least one cargo container onto an aircraft and for unloading at least one cargo container off of an aircraft, the cargo container transport apparatus comprising:

a wheeled vehicle base portion;

an elevatable platform positioned to overlie the wheeled vehicle portion;

a cargo container support surface having conveying means positioned adjacent the elevatable platform for conveying the at least one cargo container into and out of the aircraft, a pair of side support rails extending outwardly from the cargo container support surface, each one of the pair of side support rails positioned substantially opposite the other one of the pair of side support rails, the conveying means comprises a conveyor positioned adjacent the side support rails for conveying the at least one cargo container into and out of an aircraft cargo hold; and pivoting means positioned between the elevatable platform and the wheeled vehicle for pivoting a proximal or distal portion of the elevatable platform during loading or unloading of the at least one cargo container onto or off of the elevatable platform; and a proximal and a distal ramp positioned to respectively extend outwardly from a proximal portion and a distal portion of the cargo container support surface.

* * * * *